Patented Aug. 31, 1943

2,328,333

UNITED STATES PATENT OFFICE 2,328,333

POLYMERIZATION PROCESS

Richard D. Freeman and Gordon P. Schmelter, Midland, Mich., assignors to The Dow Chemical Company, Midland, Mich., a corporation of Michigan No Drawing. Application August 7, 1939, Serial No. 288,764

2 Claims. (Cl. 18—58)

This invention concerns the polymerization of resin-forming materials in molds.

It is known to prepare molded objects from synthetic resins by introducing a monomeric or partially polymerized resin-forming material in the liquid state into a mold and then polymerizing it in place. From a practical standpoint, however, the development of this process has been somewhat retarded by the lack of a suitable material of construction for the mold. Thus, molds formed of the common metals iron, steel, copper, lead, and tin are virtually useless, since these metals frequently act as polymerization retarders and often cause brittleness, instability, or discoloration in the polymeric products. Other metals, such as stainless steel and aluminum, have been recommended as mold materials, but are relatively expensive and are difficult to fabricate into molds of intricate design. Plaster molds are ordinarily out of the question because of the strong tendency of most resinous products to stick to plaster surfaces. For these reasons, fabrication of resins by polymerization in molds has not met with general acceptance.

In the present invention it is proposed to obviate the difficulties of prior art practice by coating the inner surface of the mold prior to polymerization with a continuous film of a cellulose ether insoluble in the polymerizable material, preferably with a water-soluble cellulose ether film. This film does not interfere with the polymerization itself, but does eliminate sticking of the resin to the mold, thus facilitating removal of the molded object, and, in the case of metal molds, also prevents the metal from adversely affecting the polymerization process.

In practice, before each polymerization, the inner surfaces of the mold are coated, as by dipping, spraying, etc., with a solution of the cellulose ether, e. g. methyl cellulose, in any suitable solvent, preferably water, after which the mold is allowed to dry. The polymerizable liquid is then poured or forced into the mold and subjected to polymerizing conditions, in accordance with known practice. When polymerization is complete, the solid resinous object is easily removed from the mold. In general, the cellulose ether film has no tendency to stick to the molded resinous object. However, if any of the cellulose ether film should cling to the molded piece, it may be removed by a simple buffing operation, or, in the case of water-soluble cellulose ether films, by washing with water.

If, when using a water-soluble cellulose ether, the process of the invention is to be carried out in molds formed of a metal, such as iron, which might be corroded by contact with water, it is preferable to coat each new mold before its initial use with a lacquer which forms a water-impervious film, preferably a film to which the water-soluble cellulose ether film will adhere firmly. Lacquers prepared from a low ethoxy type (44–46%) ethyl cellulose are highly satisfactory for the purpose.

The use of water-soluble cellulose ethers according to the invention is greatly to be preferred to the use of water-soluble natural gums, starch, dextrins, glues, etc., as mold coatings. These latter materials form only discontinuous or weak films on the mold surfaces and hence are relatively ineffective either in preventing contamination of the resin-forming liquid or in eliminating sticking of the molded object.

In so far as we are aware, the use of water-soluble cellulose ethers as mold coatings is applicable to the polymerization in molds of any resin-forming material which can be polymerized to a solid product. It is of particular value in the polymerization of styrene and other polymerizable vinyl compounds, such as vinyl chloride, vinyl acetate, esters of acrylic and methacrylic acid, etc. The polymerizable compound is employed in liquid form, either as the monomeric material or as a partially polymerized product.

The following examples will illustrate the invention:

Example 1

A plastic mold to be used for forming a cast of a human head was coated on the interior with a 5% aqueous solution of methyl cellulose and allowed to dry. The treated mold was filled with a syrupy solution of partially polymerized styrene containing about 60% polymer, and then heated at a temperature of 90 C. for 5 days. At the end of this time the mold was transferred to an annealing chamber wherein it was allowed to cool gradually. After complete cooling, the mold was opened without any sticking of the polystyrene to the walls. The casting possessed a perfectly smooth surface and excellent definition.

Example 2

An iron mold was coated on the inside with an ethyl cellulose lacquer, consisting of ethyl cellulose (44% ethoxy type) dissolved in a mixture of toluene and ethanol, dried, and then coated with a 5% aqueous solution of medium viscosity type methyl cellulose (containing 31.8% methoxyl). The mold was filled with a 60% solution of polystyrene in mono-styrene, closed and heated at 138–140° C. for five days. After cooling, the mold was opened. The molding released easily from the mold, was colorless and was coated with film of colorless mold lining material which was easily removed by gentle buffing.

A second molding, made in an identical fashion with the exception that the mold used was not coated, was highly discolored and had a considerable amount of material ingrained in its surface, the removal of which required a large amount of buffing.

*Example 3*

A tube of Dowmetal (an alloy consisting essentially of magnesium), 3 inches in diameter and closed at one end, was coated on the inside with an aqueous methyl cellulose solution, after which it was dried and filled with mono-styrene. The tube was then closed, and heated for 96 hours at 95° C., for 64 hours at 147° C. and finally for 6 hours at 185° C. Following this treatment, the tube and its contents were cooled gradually in an annealing chamber and then opened. The molded product, a rod of polystyrene, slipped easily from the tubular mold, and had a smooth surface which required little polishing.

It is to be understood that the foregoing description is illustrative rather than strictly limitative and that the invention is co-extensive in scope with the following claims.

We claim:

1. In a process of polymerizing styrene in an iron mold, the improvement which comprises applying to the inner surfaces of the mold prior to polymerization a water-impervious film of ethyl cellulose and then applying over such film a film of water-soluble methyl cellulose, whereby contamination of the polystyrene and sticking of the polymerized object to the mold are prevented.

2. In a process of polymerizing a resin-forming mono-vinyl compound in a metal mold, the improvement which comprises applying to the inner surfaces of the mold, prior to the polymerization, a water-impervious film of a cellulose ether and applying over said film a film of water-soluble cellulose ether, whereby contamination of the resin-forming mono-vinyl compound and sticking of the polymerized object to the mold are prevented.

RICHARD D. FREEMAN.
GORDON P. SCHMELTER.